(12) United States Patent
Jin et al.

(10) Patent No.: US 11,482,738 B2
(45) Date of Patent: Oct. 25, 2022

(54) BATTERY MODULE (71) Applicant: Contemporary Amperex Technology Co., Limited, Fujian (CN)

(72) Inventors: Haizu Jin, Zhangwan Town (CN); Dongyang Shi, Zhangwan Town (CN); Fei Hu, Zhangwan Town (CN); Kaijie You, Zhangwan Town (CN); Xingdi Chen, Zhangwan Town (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 186 days.

(21) Appl. No.: 16/571,810

(22) Filed: Sep. 16, 2019

(65) Prior Publication Data
US 2020/0212518 A1 Jul. 2, 2020

(30) Foreign Application Priority Data
Dec. 30, 2018 (CN) .......................... 201822274851.1

(51) Int. Cl.
*H01M 10/613* (2014.01)
*H01M 10/653* (2014.01)
(Continued)

(52) U.S. Cl.
CPC ..... *H01M 10/613* (2015.04); *H01M 10/0431* (2013.01); *H01M 10/0463* (2013.01);
(Continued)

(58) Field of Classification Search
CPC ............. H01M 10/613; H01M 10/653; H01M 10/6555; H01M 10/0431; H01M 10/6556
See application file for complete search history.

(56) References Cited

U.S. PATENT DOCUMENTS 9,236,590 B2 1/2016 Aoki
2003/0129479 A1* 7/2003 Munenaga ............ H01M 10/04
429/94
(Continued)

FOREIGN PATENT DOCUMENTS

CN 102347509 A 2/2012
CN 203812983 U 9/2014
(Continued)

OTHER PUBLICATIONS

Machine Translation of KR20140007029A (May 11, 2021) (Year: 2021).*

(Continued)

*Primary Examiner* — Matthew J Merkling
(74) *Attorney, Agent, or Firm* — Kilpatrick Townsend & Stockton LLP (57) ABSTRACT

A battery module including a first battery group, a second battery group, a cooling plate, and a plurality of busbars electrically connected with a plurality of battery cells. The cooling plate is placed between the first battery group and the second battery group, and the two surfaces of the cooling plate are respectively bonded onto the first battery group and the second battery group with thermally conductive adhesive, the first battery group and the second battery group can be mounted close to the cooling plate, thus increasing the heat dissipation area and improving the heat dissipation effect.

7 Claims, 8 Drawing Sheets

(51) Int. Cl.
*H01M 10/6555* (2014.01)
*H01M 10/04* (2006.01)
*H01M 10/6556* (2014.01)

(52) U.S. Cl.
CPC ..... *H01M 10/653* (2015.04); *H01M 10/6555* (2015.04); *H01M 10/6556* (2015.04)

(56) References Cited

U.S. PATENT DOCUMENTS

| | | |
|---|---|---|
| 2012/0028099 A1 | 2/2012 | Aoki |
| 2012/0148889 A1* | 6/2012 | Fuhr ................ H01M 10/6554 429/87 |
| 2014/0090812 A1 | 4/2014 | Schmid et al. |
| 2016/0079640 A1* | 3/2016 | Kim .................. H01M 10/625 429/120 |
| 2017/0025657 A1* | 1/2017 | Reinshagen ............ B60L 58/26 |
| 2017/0288278 A1* | 10/2017 | Ming ........................ C09J 9/00 |
| 2019/0109357 A1* | 4/2019 | Kenney ............... H01M 10/625 |
| 2019/0280355 A1* | 9/2019 | Kim .................... H01M 10/653 |
| 2019/0288353 A1* | 9/2019 | Harris ................ H01M 10/6556 |
| 2019/0366876 A1* | 12/2019 | Cheadle ................ F28D 1/0308 |

FOREIGN PATENT DOCUMENTS

| | | |
|---|---|---|
| CN | 108879023 A | 11/2018 |
| CN | 209249567 U | 8/2019 |
| EP | 2413421 A1 | 2/2012 |
| JP | 2016161158 A | 9/2016 |
| JP | 2017027962 A | 2/2017 |
| KR | 20140007029 A | 1/2014 |
| WO | 2018062226 A1 | 4/2018 |

OTHER PUBLICATIONS

European Search Report issued in Application No. 19175827.5 dated Dec. 5, 2019.
International Application No. PCT/CN2019/121029 International Search Report of the International Searching Authority, dated Feb. 19, 2020, 4 pages.
International Application No. PCT/CN2019/121029 Written Opinion of the International Searching Authority, dated Feb. 19, 2020, 6 pages.

\* cited by examiner

BATTERY MODULE

PRIORITY

This application claims priority to C.N. Application No. CN201822274851.1 filed on Dec. 30, 2018, which is incorporated by reference herein.

FIELD

This disclosure generally relates to the field of energy storage elements, and more particularly, to a battery module.

BACKGROUND

In a conventional design, in order to dissipate heat from a battery module, a cooling system (e.g., a cooling plate) is provided. However, the cooling plate in the conventional design is typically horizontally disposed, which means that only one surface of the cooling plate contacts the battery modules, so the cooling plate needs to be made large enough to fully contact most of the battery modules in the battery module. When the cooling plate is enlarged, it will occupy more space of the battery module, thereby reducing the energy density of the battery module. In addition, the contact surface of the cooling plate and the contact surface of the battery module may not be absolutely flat from the manufacturing process. Accordingly, the contact area between the cooling plate and the battery modules is reduced, resulting in smaller heat dissipation area of the battery module and reduced heat dissipation effect of the cooling plate.

Therefore, an improved design for a battery module is needed to further increase the energy density and enhance the heat dissipation effect.

SUMMARY

Disclosed herein is a battery module including a first battery group, a second battery group, and a cooling plate vertically disposed between the first battery group and the second battery group, two surfaces of the cooling plate can be respectively bonded onto the first and the second battery groups with a thermally conductive adhesive.

In some embodiments, the first and the second battery groups each can include a plurality of battery cells arranged along a horizontal direction, and a plurality of busbars electrically connected with the plurality of battery cells. The battery cells each can include a cell case and an electrode assembly accommodated in the cell case. The electrode assembly can include a first electrode plate, a second electrode plate, and a separator disposed between the first electrode plate and the second electrode plate. In some embodiments, the electrode assembly can have a flat wound configuration, in which an outer surfaces of the electrode assembly can include two flat sides facing each other along a vertical direction. In some embodiments, the electrode assembly can have a laminated configuration, in which the first electrode plate, the separator and the second electrode plate can be stacked along a vertical direction.

In some embodiments, the battery cells can include a plurality of electrode assemblies stacked along the vertical direction. In some embodiments, the number of layers of said battery cells stacked along the vertical direction in the first battery group can be about one layer to five layers. In some embodiments, the number of layers of said battery cells stacked along the vertical direction in the second battery group can be about one layer to five layers.

In some embodiments, the dimension of both the first battery group and the second battery group along the horizontal direction can be larger than the dimension along the vertical direction.

In some embodiments, the thermally conductive adhesive can be a type of structural adhesive with a thickness of about 0.5 mm to 20 mm.

In some embodiments, a fluid passage can be provided in the interior of the cooling plate, which can extend along the horizontal direction with an inlet of the fluid passage and an outlet of the fluid passage located at the same end of the cooling plate along the horizontal direction.

In some embodiments, three fluid passages can be arranged side by side along the vertical direction.

In some embodiments, the cooling plate can include a guide plate, in which three or more the fluid passages can be arranged side by side along the vertical direction and can penetrate the guide plate along the horizontal direction. In some embodiments, the cooling plate can include a collecting tail plate, which can be disposed at an end of the guide plate away from the inlet and can have a collecting trough connected with the fluid passage, so as to establish the connection between the inlet and the outlet. In some embodiments, the cooling plate can include a joint end plate, which can include an inlet joint and an outlet joint arranged side by side along the vertical direction, and can be connected with the guide plate, with the inlet mated with the inlet joint and the outlet mated with the outlet joint.

In some embodiments, the battery module can include a conveying pipe coupled to the inlet joint of the joint end plate so as to establish a connection between the conveying pipe and the inlet.

In some embodiments, the battery module can include a return pipe coupled to the outlet joint of the joint end plate so as to establish a connection between the return pipe and the inlet.

Also disclosed herein is a method of improving heat dissipation of a battery module during charging and discharging, which can include disposing a cooling plate between a first battery group and a second battery group in the battery module, and respectively bonding two surfaces of the cooling plate onto the first and the second battery groups with a thermally conductive adhesive.

Further disclosed herein is a method of manufacturing a battery module, which can include placing a first battery group and a second battery group in the battery module, disposing a cooling plate between a first battery group and a second battery group in the battery module, and respectively bonding two surfaces of the cooling plate onto the first and the second battery groups with a thermally conductive adhesive.

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

The battery module according to the present disclosure will be further described in detail with reference to the accompanying drawings.

The elements in the figures are described in the following:
1: first battery group
11: battery cell
12: busbar
11a: wound electrode assembly
11b: laminated electrode assembly
111: electrode assembly
112: cell case
113: electrode terminal connector
114: cover plate
1110: flat side
1111: first electrode plate
1112: second electrode plate
1113: separator
1121: first surface
1122: second surface
2: second battery group
3: cooling plate
31: fluid passage
32: guiding plate
33: joint end plate
34: collecting tail plate
311: inlet
312: outlet
331: inlet joint
332: outlet joint
341: collecting trough
4: thermally conductive adhesive
5: conveying pipe
6: return pipe Exemplary embodiments will now be described in detail hereinafter with reference to the accompanying drawings in order to fully explain the technical content, structural features, purposes and effects of the present disclosure.

Unless otherwise expressly stated and defined, the terms "first" and "second" in this application are only used for description, and should not be construed as indicating or implying the relative importance. The term "a plurality of" can mean two or more. The terms "connection" and "fixation" should be construed in a broad sense. For example, "connection" can be fixed connection, removable connection, integral connection, or electrical connection; also, it can be direct connection or indirect connection through an intermediary. For those skilled in the art, the specific meanings of the above terms in the present application can be understood on a case-by-case basis.

In the present disclosure, the direction indicated by arrow X in all the drawings can mean the length direction, the direction indicated by arrow Y can mean the width direction, and the direction indicated by arrow Z can mean the vertical direction. The horizontal direction can mean the direction parallel to the horizontal plane, can be said length or width direction. In addition, the horizontal direction can include not only the direction absolutely parallel to the horizontal plane but also the direction generally parallel to the horizontal plane according to conventional engineering cognition. The vertical direction can mean the direction perpendicular to the horizontal plane, and can include not only the direction absolutely perpendicular to the horizontal plane but also the direction generally perpendicular to the horizontal plane according to conventional engineering cognition. Moreover, "upper", "lower", "top", "bottom" and the like described in this application can be expressed relative to the vertical direction. For the convenience of understanding and explanation, the directions will be described hereinafter based on the X-Y-Z coordinate system in the drawings.

The type of battery in the present disclosure can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery can be a lithium ion battery.

Figure 1:
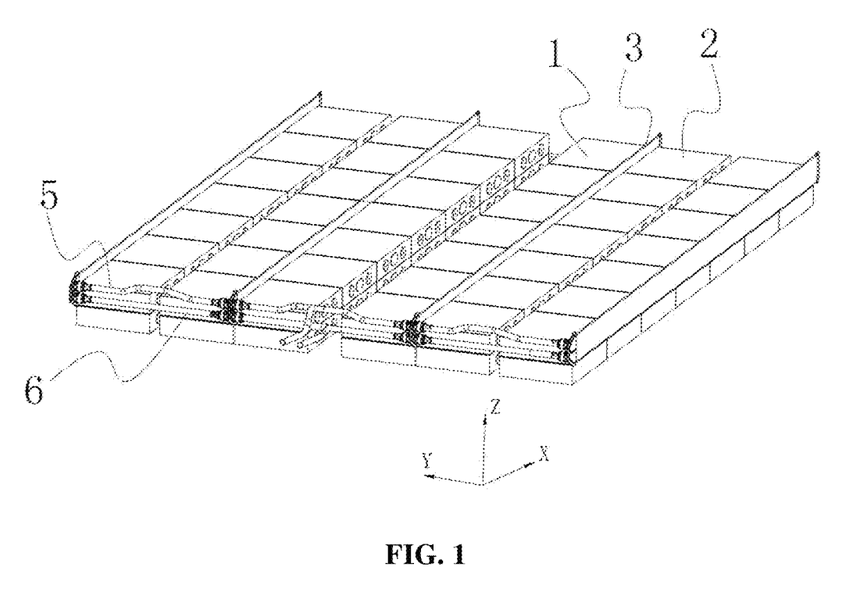
FIG. 1 is a schematic diagram of a battery module, according to some embodiments of the present disclosure.

With reference to FIGS. 1 to 8, the present disclosure provides a battery module which can include a first battery group 1, a second battery group 2, a cooling plate 3, a thermal conductive adhesive 4, a conveying pipe 5, and a return pipe 6. As shown in FIG. 1, cooling plate 3 can be arranged between first battery group 1 and second battery group 2, and a plurality of first battery group 1 and second battery group 2. The cooling plate are arranged along the Y-axis direction in the coordinate system in FIG. 1, and can be connected to cooling plate 3 via conveying pipe 5 and return pipe 6. Conveying pipe 5 can convey the cooling medium to cooling plate 3, while the cooling medium outputted by cooling plate 3 can be recovered through the return pipe, and then cooled and re-input into conveying pipe 5, forming a circulatory loop among conveying pipe 5, cooling plate 3 and return pipe 6, which can enable continuous cooling of the battery module and increases the cooling efficiency.

Figure 2:
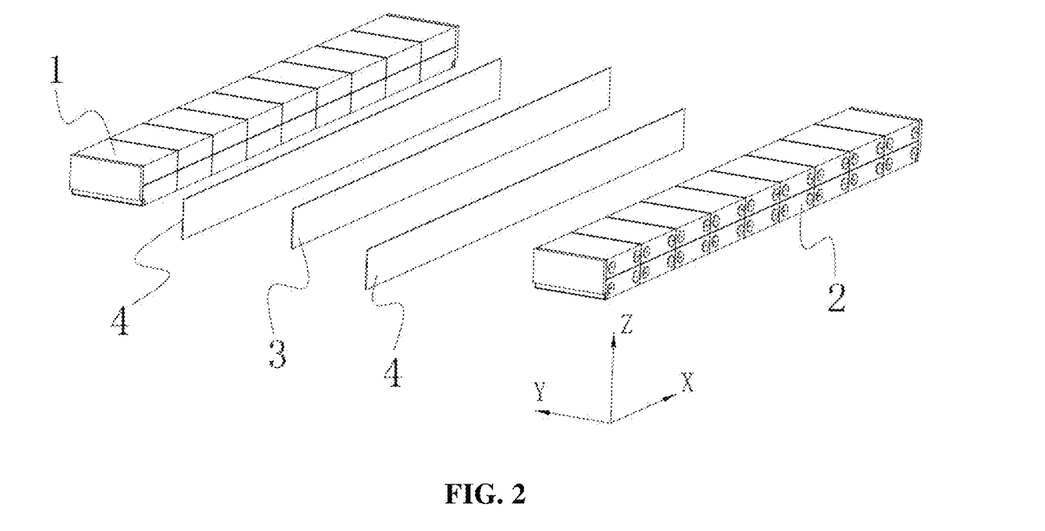
FIG. 2 is a structural view of a battery module, according to some embodiments of the present disclosure.
Figure 3:
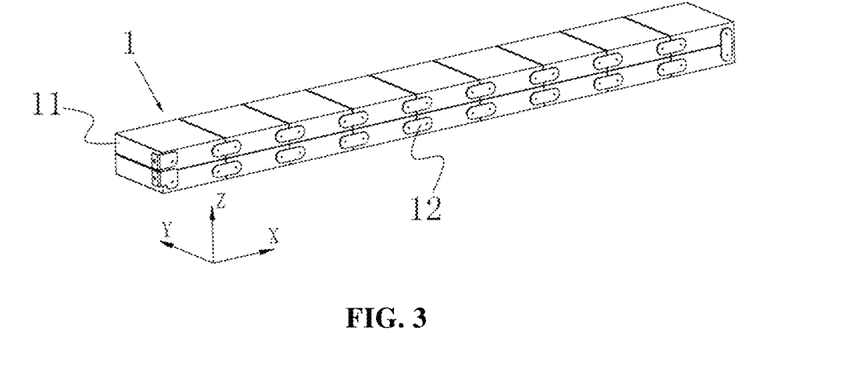
FIG. 3 a schematic diagram of a battery module with busbars, according to some embodiments of the present disclosure.

As shown in FIG. 2, first battery group 1 can be bonded onto one side of cooling plate 3 with thermal conductive adhesive 4, while second battery group 2 can be bonded onto the other side of cooling plate 3 with thermal conductive adhesive 4. A plurality of battery cells 11 can be arranged along the horizontal direction (e.g., X-axis direction) of first battery group 1, and can also be stacked layer by layer along the vertical direction (Z-axis direction), and battery cells 11 stacked in battery module 1 can be electrically connected through a plurality of busbars 12 (as shown in FIG. 3). Second battery group 2 can be the same as first battery group 1. In some embodiments, the dimension of second battery group 2 along the horizontal direction can be the same as that of first battery group 1 along the horizontal direction, which means that the layers of battery cells 11 stacked along X-axis direction in second battery group 2 and first battery group 1 can be the same. In some embodiments, the dimension of second battery group 2 along the vertical direction can be the same as that of first battery group 1 along the vertical direction, which means the layers of battery cells 11 stacked along Z-axis direction in second battery group 2 and first battery group 1 can be the same. Cooling plate 3 can be vertically disposed, i.e. extending along the vertical direction (e.g., Z-axis direction). Both surfaces of cooling plate 3 can be provided with thermal conductive adhesive 4, and can be respectively bonded onto first battery group 1 and second battery group 2 with thermal conductive adhesive 4.

Unlike a conventional battery module design, the technical solution in the present disclosure is directed to a cooling plate which can be arranged between and shared by two battery modules, so as to make full use of the effect of the cooling plate while maintaining an equivalent or nearly equivalent cooling effect for the battery cells. Specifically, each battery cell in the battery module is laid flat so that, when the electrode assemblies are of a flat wound configuration, the outer surfaces of the electrode assemblies include two flat sides facing each other along the vertical direction; or, when the electrode assemblies are of a laminated configuration, the first electrode plate, the separator and the second electrode plate are laminated along the vertical direction. Additionally, since the cooling plate is placed between the first battery group and the second battery group, and the two surfaces of the cooling plate are respectively bonded onto the first battery group and the second battery group with thermally conductive adhesive, the first battery group and the second battery group can be mounted close to the cooling plate, thus increasing the heat dissipation area and improving the heat dissipation effect.

In some embodiments, both first battery group 1 and second battery group 2 can be stacked along the vertical direction (Z-axis direction) by about one layer to five layers. In some embodiments, there can be about two or three layers. As shown in FIG. 2, both first battery group 1 and second battery group 2 can be stacked along the vertical direction (Z-axis direction) by about two layers. The length of first battery group 1 stacked along X-axis direction can be greater than that of first battery group 1 stacked along Z-axis direction. The length of second battery group 2 stacked along X-axis direction can be greater than that of second battery group 2 stacked along Z-axis direction.

As shown in FIG. 2, the thickness of thermally conductive adhesive 4 coated between the battery modules and cooling plate 3 can be about 0.5 mm to 20 mm (0.5 mm and 20 mm inclusive). In some embodiments, the thickness of thermally conductive adhesive 4 can be about 1 mm to 18 m, about 2 mm to 15 mm, about 3 mm to 13 mm, about 5 mm to 10 mm, about 6 mm to 8 mm, about 0.5 mm to 8 mm, or about 6 mm to 20 mm. Within the above-mentioned thickness range, thermally conductive adhesive 4 can achieve better bonding effect between the battery modules and cooling plate 3, and thermally conductive adhesive 4 after solidification will not form a thicker adhesive layer, thus significantly reducing waste and the negative impact on the energy density of the whole battery module and the cooling effect of cooling plate 3. Thermally conductive adhesive 4 can be a type of structural adhesive.

The selection and specification of the structural adhesive varies based on the required parameters, as well as environmental conditions. In some embodiments, the structural adhesive can be selected as a methacrylate, catalyzed via an adhesive activator (not shown). In some embodiments, the structural adhesive utilizes a longer polymer chain then did older generations, this ensures less volatile components and provides various performance benefits. The mechanical properties of the structural adhesive are consistent across typical operational temperature of the battery cells in the present disclosure. In some embodiments, the use of various epoxy formulations or urethane based adhesives or others adhesive technologies is warranted for specific situations.

Cooling plate 3 may not be absolutely flat due to challenges in the manufacturing process. Without thermally conductive adhesive 4, cooling plate 3 may no be effectively bonded onto first battery group 1, which will result in a small contact area and also a small heat transfer area. With thermal conductive adhesive 4, the gap between cooling plate 3 and first battery group 1 and the gap between cooling plate 3 and second battery group 2 can be filled, thereby increasing the heat transfer area and improving the thermal conduction effect.

Figure 4:
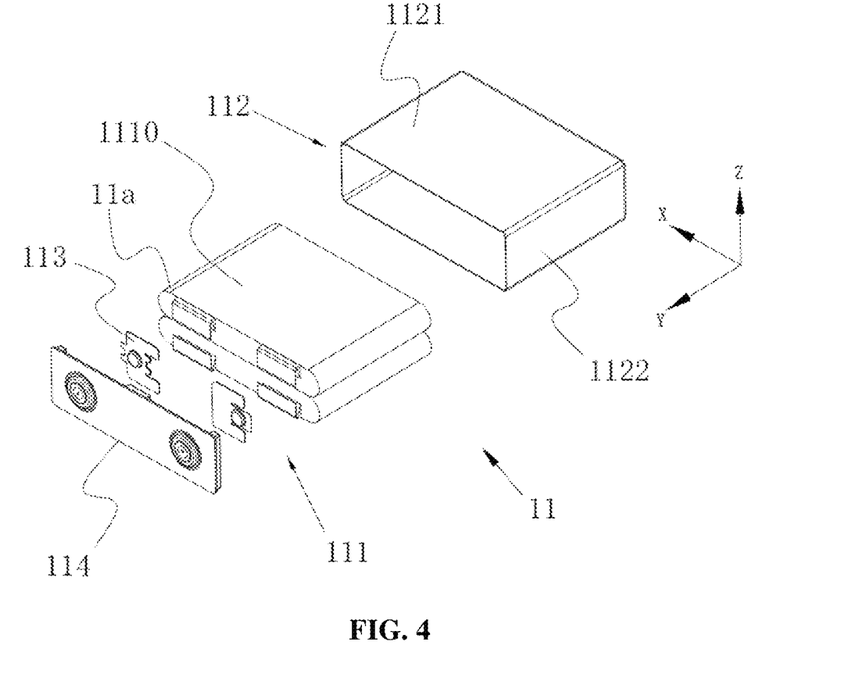
FIG. 4 is an exploded view of a battery module, according to some embodiments of the present disclosure.

As shown in FIG. 2, electrode assemblies 111 of first battery group 1 and second battery group 2 can be laid flat, such that when electrode assemblies 111 are of a flat wound configuration, the outer surfaces of electrode assemblies 111 can include two flat sides 1110 (as shown in FIG. 4) facing each other along the vertical direction. Or when electrode assemblies 111 are of a laminated configuration, a first electrode plate 1111, a separator 1113 and a second electrode plate 1112 can be laminated along the vertical direction. When electrode assemblies 111 of a battery cell 11 expand, the maximum expansion force appears in the vertical direction. However, since electrode assemblies 111 of battery cell 11 are vertically arranged in the conventional design, when electrode assemblies 111 expand, the maximum expansion force appears in the horizontal direction.

As shown in FIG. 4, battery cell 11 can include electrode assemblies 111, a cell case 112, electrode terminal connectors 113, and a cover plate 114. In some embodiments, cell case 112 can be a shape of rectangular (hexahedron). Cell case 112 can have an inner space accommodating electrode assemblies 111 and electrolyte (not shown). In addition, cell case 112 can also have an opening. Electrode assemblies 111 can be contained in cell case 112. Cover plate 114 can cover the opening, and is intended for enclosing electrode assemblies 111 in cell case 112. Electrode assemblies 111 and the electrode terminals can be electrically connected by electrode terminal connectors 113. In some embodiments, there can be two electrode terminal connectors 113, which can be a positive terminal connector and a negative terminal connector, respectively. Cell case 112 can be made of exemplary materials including, but not limited to aluminum, aluminum alloy and plastic materials.

Electrode assemblies 111 can be contained in cell case 112, which can include first electrode plate 1111, second electrode plate 1112, and separator 1113 disposed between first electrode plate 1111 and second electrode plate 1112. First electrode plate 1111 can be positive or negative, and second electrode plate 1112 can be the opposite in polarity to first electrode plate 1111, which means that second electrode plate 1112 can be negative or positive correspondingly. Separator 1113 can be an insulator disposed between first electrode plate 1111 and second electrode plate 1112. Electrode assemblies 111 can be a wound electrode assembly 11$a$ as shown in FIG. 5 or a laminated electrode assembly 11$b$ as shown in FIG. 6.

In some embodiments, first electrode plate 1111 can be positive, while second electrode plate 1112 can be negative Similarly, in some embodiments, first electrode plate 1111 can be negative while second electrode plate 1112 can be positive. Furthermore, the positive electrode active mass can be applied onto the coating area of the positive electrode plate, and the negative electrode active mass can be applied onto the coating area of the negative electrode plate. The uncoated area extending from the coating area can function as an electrode tab, and electrode assemblies 111 can include two electrode tabs, i.e. a positive electrode tab and a negative electrode tab, wherein the positive electrode tab can extend from the coating area of the positive electrode plate, while the negative electrode tab can extend from the coating area of the negative electrode plate. The positive electrode tab and the positive electrode terminal can be electrically connected by the positive terminal connector, while the negative electrode tab and the negative electrode terminal can be electrically connected by the negative terminal connector.

Cell case 112 can be substantially hexahedral, and can include two first surfaces 1121 and two second surfaces 1122, wherein the area of first surfaces 1121 can be larger than that of second surfaces 1122. In each battery cell 11, two second surfaces 1122 can face each other along the horizontal direction (e.g. X-axis direction), while two first surfaces 1121 can face each other along the vertical direction (Z-axis direction).

Figure 5:
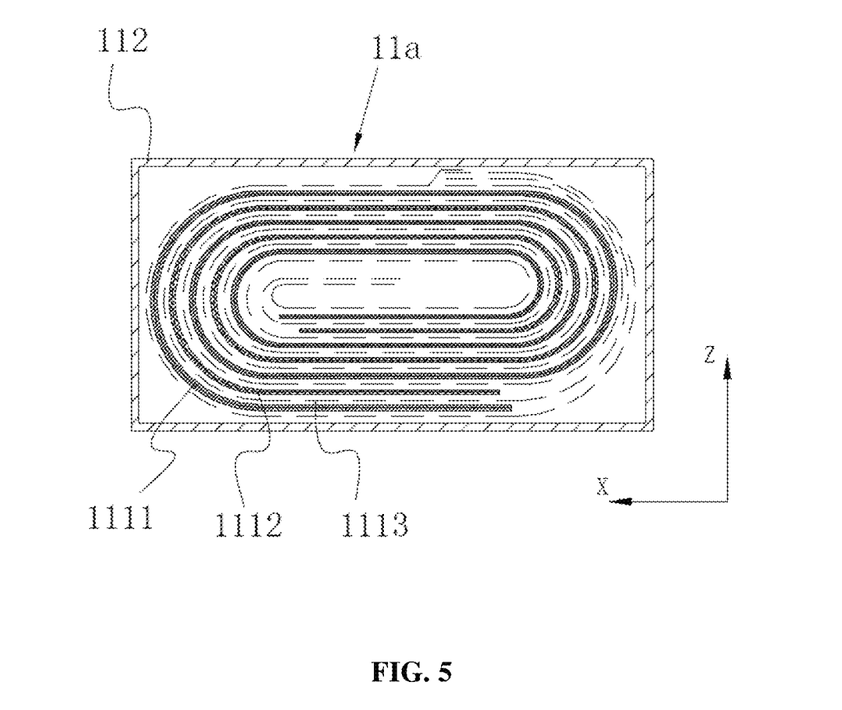
FIG. 5 is a sectional view of wound battery cells in a battery module, according to some embodiments of the present disclosure.
Figure 6:
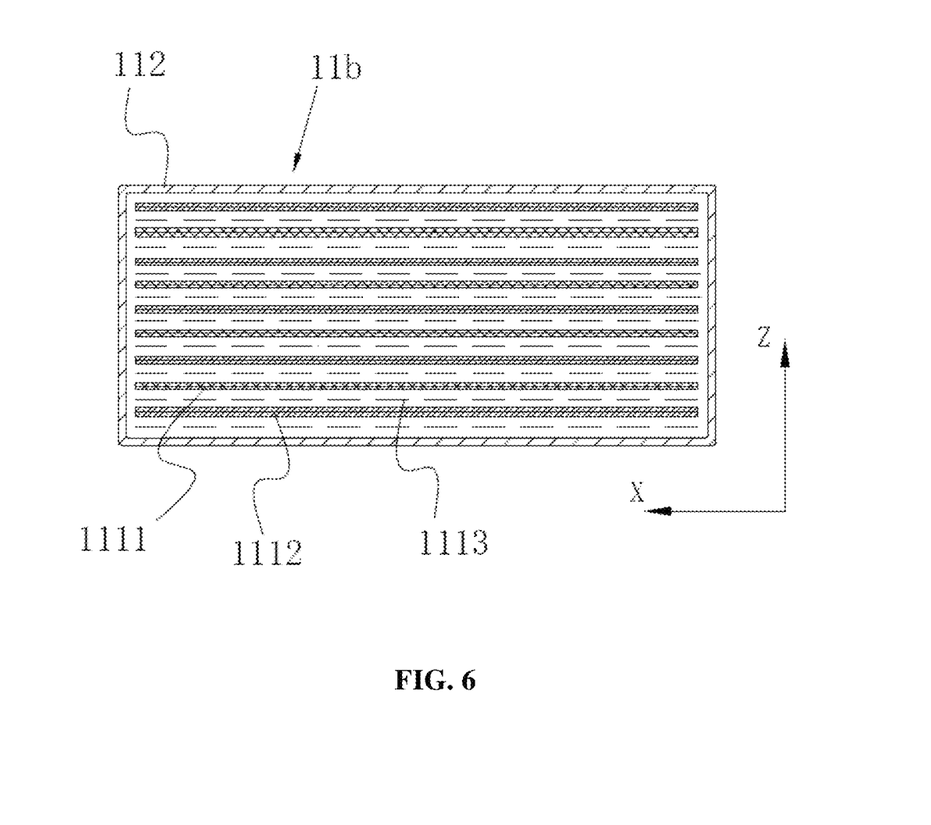
FIG. 6 is a sectional view of laminated battery cells in a battery module, according to some embodiments of the present disclosure.

As shown in FIGS. 5 and 6, when electrode assemblies 111 are of a flat wound configuration, the outer surfaces of electrode assemblies 111 can include two flat sides 1110 facing each other along the vertical direction (Z-axis direction). Flat sides 1110 and first surfaces 1121 can face each other. Electrode assemblies 111 can be substantially hexahedral, and flat sides 1110 can be substantially parallel to the winding axis and are the largest outer surface.

As shown in FIG. 6, when electrode assemblies 111 are of a laminated configuration, first electrode plate 1111, separator 1113, and second electrode plate 1112 can be stacked along the vertical direction. The surface of first electrode plate 1111 and first surface 1121 can face each other.

Typically, electrode assemblies 111 expand in the thickness direction of first electrode plate 1111 during charging and discharging process. In electrode assemblies 111 of a wound configuration, the expansion force is the largest in the direction perpendicular to flat side 1110, while in electrode assemblies 111 of a laminated configuration, the expansion force is the largest along the stacking direction of first electrode plate 1111 and second electrode plate 1112.

In some embodiments, electrode assemblies 111 can employ a wound or a laminated configuration. When electrode assemblies 111 are of a wound configuration, flat sides 1110 of electrode assemblies 111 can face the vertical direction (Z-axis direction). When electrode assemblies 111 are of a laminated configuration, first electrode plates 1111 and second electrode plates 1112 of electrode assemblies 111 can be stacked in the vertical direction (Z-axis direction). It can be seen that for both wound configuration and laminated configuration, the direction of the maximum expansion force exerted by electrode assemblies 111 on cell case 112 is vertical.

Battery cells 11 can have a plurality of electrode assemblies 111 which can be stacked along the vertical direction (Z-axis direction). Specifically, there can be about two electrode assemblies 111, as shown in FIG. 4. The two electrode assemblies 111 can be stacked along the vertical direction (Z-axis direction), whose positive and negative electrode tabs can be separately connected, such that the two stacked electrode assemblies 111 can be contained in cell case 112.

In the conventional design, in the battery cells of the battery modules, the direction of the maximum expansion force exerted by the electrode assemblies on the cell case is horizontal. The dimension of the battery module along the horizontal direction is much larger than that along the vertical direction. Limited by the height of the vehicle chassis, it is required that more battery cells should be stacked along the horizontal direction, thus the expansion force accumulates. The battery module in the conventional design bears a significant expansion force in the horizontal direction. In turn, very thick end plates are required on both sides of the battery module along the horizontal direction to resist the expansion force, resulting in the reduction of the energy density of the battery module. In some embodiments according to the present disclosure, since the direction of the maximum expansion force exerted by the electrode assemblies on cell case 112 is vertical, and the number of battery cells 11 stacked along the vertical direction is small, the negative influence of the maximum expansion force of battery cells 11 on the battery module is small or negligible compared to the conventional design.

In addition, since battery cells 11 generate gases inside cell case 112 during charging and discharging, the generated gases impose a force on cell case 112, thereby exacerbating the outward expansion of cell case 112. Since battery cells 11 described in the present disclosure can be laid flat, the area of first surfaces 1121 can be larger than that of second surfaces 1122, and the two first surfaces 1121 of battery cells 11 can face each other along the vertical direction, the direction of the maximum force exerted by the gases on cell case 112 can be also vertical, which further reduces the maximum expansion force of the battery modules compared to the conventional design.

Figure 7:
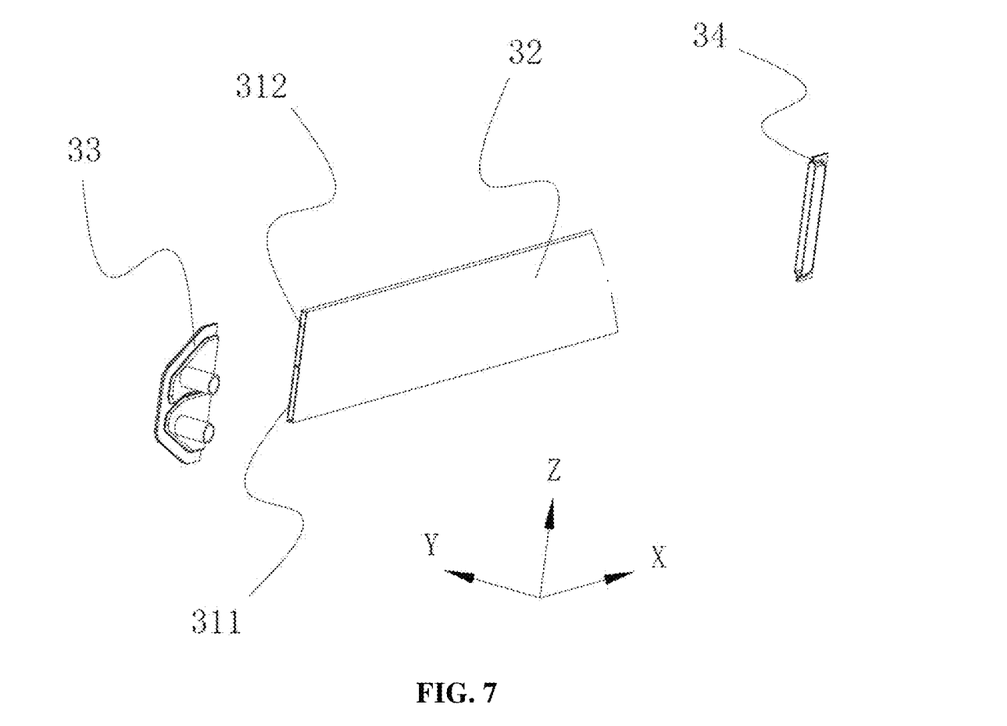
FIG. 7 is an exploded view of a cooling plate in a battery module, according to some embodiments of the present disclosure.
Figure 8:
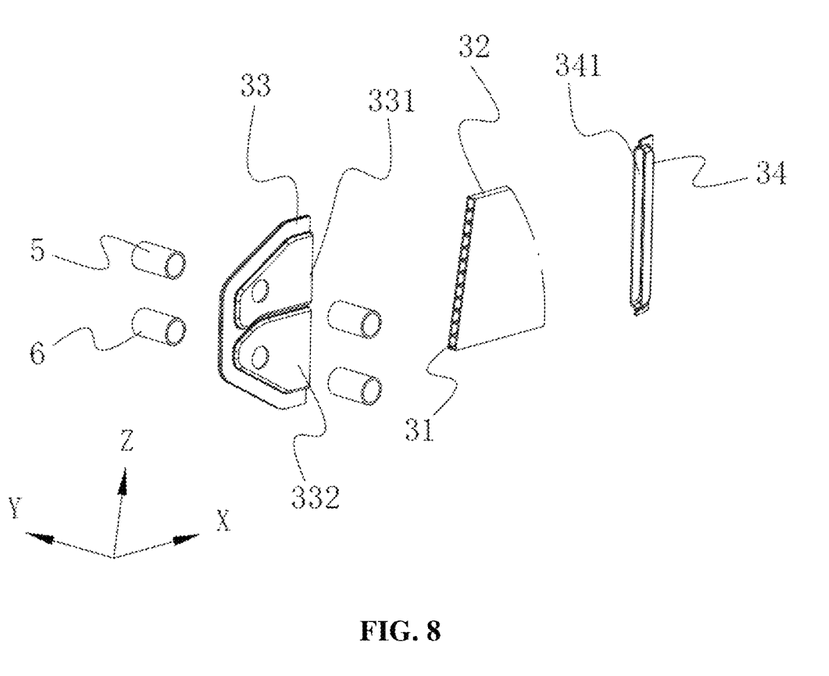
FIG. 8 is an exploded view of a part of the cooling plate in a battery module, according to some embodiments of the present disclosure.

As shown in FIG. 7, cooling plate 3 can extend along the vertical direction (e.g., Z-axis direction). As shown in FIGS. 7 and 8, a fluid passage 31 in cooling plate 3 can be disposed along the horizontal direction (e.g., X-axis direction). Therefore, the cooling medium can be injected through an inlet 311 of fluid passage 31 to cool the battery modules on both sides. After passing through fluid passage 31, the cooling medium can be outputted from an outlet 312 of fluid passage 31, forming continuous supply of the cooling medium, and maintaining the cooling effect with high efficiency. The cooling medium may be a cooling liquid (e.g., cooling water) or a cooling gas.

In addition, since inlet 311 and outlet 312 of fluid passage 31 can be arranged at the same end of cooling plate 3, the cooling medium can be evenly distributed in cooling plate 3, which guarantees a relatively small difference in the temperature of the cooling medium at both ends of cooling plate 3, and improves the cooling effect of cooling plate 3.

In order to facilitate uniform distribution of the cooling medium in cooling plate 3, three or more fluid passages 31 can be provided in cooling plate 3 along the vertical direction (e.g., Z-axis direction), which can increase the volume ratio of fluid passages 31 in cooling plate 3. Thus, the conveying amount of the cooling medium can be increased, the cooling medium can be more evenly distributed in cooling plate 3, and the cooling effect of cooling plate 3 can be improved.

As shown in FIGS. 7 and 8, cooling plate 3 can be divided into three parts, namely, a guide plate 32, a joint end plate 33, and a collecting tail plate 34. Cooling plate 3 can be made of exemplary materials including, but not limited to aluminum, aluminum alloy, magnesium aluminum alloy, and steel, such that the three parts of cooling plate 3 can be joined by welding.

In some embodiments, three or more fluid passages 31 can be disposed along the vertical direction (e.g., Z-axis direction) in guide plate 32, and penetrate both ends of guide plate 32, which means that fluid passages 31 can be arranged in a horizontal line at same intervals in the entire guide plate 32, such that the cooling medium can be evenly distributed in fluid passages 31 to achieve a good cooling effect. In order to allow the cooling medium to return when it flows to the end of guide plate 32, collecting tail plate 34 can be welded at the end of guide plate 32, in which a collecting trough 341 is formed. Collecting trough 341 can connect all the fluid passages 31 of guide plate 32 to achieve the purpose of guiding the cooling medium to rotate 180 degrees.

As shown in FIG. 8, an inlet joint 331 and an outlet joint 332 can be disposed on joint end plate 33 along the vertical direction (e.g., Z-axis direction), wherein inlet joint 331 can be arranged above or below outlet joint 332. In some embodiments, inlet joint 331 can be arranged above outlet joint 332 such that when the cooling medium returns from collecting tail plate 34, it can flow into fluid passages 31 of guide plate 32 by gravity, and then flows out through outlet joint 332 to continuously cool the battery modules bonded on both sides of cooling plate 3. Because guide plate 32 has more than three fluid passages 31, the cooling medium can be evenly distributed in the guide plate 32, thus the potential problem of running of the cooling medium at the top of fluid passages 31 due to gravity can be avoided, and both the cooling efficiency and cooling effect of cooling plate 3 are improved.

It should be noted that, although the above embodiments have been described herein, the scope of present disclosure is not limited thereby. Therefore, based on the innovative concept of the present disclosure, modifications to the embodiments described herein, equivalent structural or process transformations based on the contents of the description and drawings of the present disclosure, and direct or indirect application of the above-described technical solutions in other related technical fields are included in the present disclosure.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery module, comprising:
    a first battery group and a second battery group, each comprising a plurality of busbars and a plurality of battery cells arranged along a horizontal direction and electrically connected with the plurality of busbars, each battery cell comprising:
        a cell case in a hexahedral shape comprising two first surfaces and two second surfaces, an area of the two first surfaces is larger than that of the second surfaces, the two first surfaces face each other along a vertical direction and the two second surfaces face each other along a horizontal direction, and
        a plurality of electrode assemblies accommodated in the cell case and stacked along the vertical direction, each electrode assembly comprising a first electrode plate, a second electrode plate, and a separator disposed between the first electrode plate and the second electrode plate, and having one of:
            a flat wound configuration in which outer surfaces of the electrode assembly comprise two flat sides facing each other along a vertical direction, or
            a laminated configuration in which the first electrode plate, the separator, and the second electrode plate are stacked along a vertical direction; and
    a cooling plate vertically disposed between the first battery group and the second battery group, two surfaces of the cooling plate are respectively bonded onto the first battery group and the second battery group with a thermally conductive adhesive, wherein the cooling plate is not absolutely flat from a manufacturing process such that gaps are formed between the cooling plate with the first battery group and/or the second battery group, and a liquid precursor of the thermally conductive adhesive fills the gaps and solidifies to become the thermally conductive adhesive, thereby increasing heat transfer area and improving thermal conduction effect, the cooling plate comprising:
        a guide plate comprising three or more fluid passages extending along a horizontal direction and arranged above one another along the vertical direction, each of the three or more fluid passages having a first opening through a first end of the guide plate and a second opening through a second end of the guide plate,
    a collecting tail plate disposed at the first end of the guide plate and comprising a collecting trough connected to more than one of the first openings, and
    a joint end plate disposed at the second end of the guide plate and comprising an inlet joint configured to direct a cooling medium from a conveying pipe extending through the joint end plate to a first more than one of the second openings and an outlet joint configured to direct the cooling medium from a second more than one of the second openings to a return pipe extending through the joint end plate, the inlet joint located above the outlet joint in the vertical direction.

2. The battery module according to claim 1, wherein a number of the plurality of electrode assemblies accommodated in the cells case and stacked along the vertical direction in one or more of the first battery group and the second battery group is about one to five.

3. The battery module according to claim 1, wherein a dimension of the first battery group along a horizontal direction is larger than a dimension of the first battery group along a vertical dimension, and a dimension of the second battery group along the horizontal direction is larger than a dimension of the second battery group along the vertical dimension.

4. The battery module according to claim 1, wherein the thermally conductive adhesive is a type of structural adhesive with a thickness of about 0.5 mm to 20 mm.

5. The battery module according to claim 1, comprising a conveying pipe coupled to the inlet joint of the joint end plate to establish a connection between the conveying pipe and the inlet.

6. The battery module according to claim 1, comprising a return pipe coupled to the outlet joint of the joint end plate to establish a connection between the return pipe and the outlet.

7. The battery module according to claim 1, wherein the thermally conductive adhesive is made of materials selected from methacrylate, epoxy, and urethane.

* * * * *